US008962767B2

(12) United States Patent
Clapper et al.

(10) Patent No.: US 8,962,767 B2
(45) Date of Patent: Feb. 24, 2015

(54) ISOBUTYLENE COPOLYMER WITH GRAFTED POLYMER GROUPS

(71) Applicant: 3M Innovative Properties Company, St. Paul, MN (US)

(72) Inventors: Jason D. Clapper, Lino Lakes, MN (US); Hae-Sueng Lee, Woodbury, MN (US); Joon Chatterjee, Bloomington, MN (US); Babu N. Gaddam, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 196 days.

(21) Appl. No.: 13/746,069

(22) Filed: Jan. 21, 2013

(65) Prior Publication Data

US 2013/0131273 A1    May 23, 2013

Related U.S. Application Data

(63) Continuation-in-part of application No. 13/027,484, filed on Feb. 15, 2011, now abandoned.

(51) Int. Cl.
| | | |
|---|---|---|
| C08F 10/00 | (2006.01) | |
| C09J 151/00 | (2006.01) | |
| C08L 51/00 | (2006.01) | |
| C08G 81/02 | (2006.01) | |
| C09D 123/22 | (2006.01) | |
| C09J 123/22 | (2006.01) | |
| C09J 151/06 | (2006.01) | |
| C08L 23/22 | (2006.01) | |
| C08L 51/06 | (2006.01) | |
| C09J 7/02 | (2006.01) | |
| C08L 23/26 | (2006.01) | |

(52) U.S. Cl.
CPC ............ *C09J 151/003* (2013.01); *C08L 51/003* (2013.01); *C08G 81/021* (2013.01); *C09D 123/22* (2013.01); *C09J 123/22* (2013.01); *C09J 151/06* (2013.01); *C08L 23/22* (2013.01); *C08L 51/06* (2013.01); *C09J 7/021* (2013.01); *C08L 23/26* (2013.01); *C09J 2451/00* (2013.01)
USPC .......................................... 525/333.7; 525/70

(58) Field of Classification Search
USPC ................................. 525/333.7, 70
See application file for complete search history.

(56) References Cited

U.S. PATENT DOCUMENTS

| | | | |
|---|---|---|---|
| 2,803,615 A | 8/1957 | Ahlbrecht et al. | |
| 3,842,059 A | 10/1974 | Milkovich et al. | |
| 4,181,752 A | 1/1980 | Martens et al. | |
| 4,329,384 A | 5/1982 | Vesley et al. | |
| 4,533,723 A | 8/1985 | Weitemeyer | |
| 4,619,979 A | 10/1986 | Kotnour et al. | |
| 4,732,808 A | 3/1988 | Krampe et al. | |
| 4,843,134 A | 6/1989 | Kotnour et al. | |
| 5,204,219 A | 4/1993 | Van Ooij et al. | |
| 5,459,174 A | 10/1995 | Merrill | |
| 5,464,900 A | 11/1995 | Stofko, Jr. et al. | |
| 5,468,353 A | 11/1995 | Anich et al. | |
| 5,602,221 A | 2/1997 | Bennett et al. | |
| 5,639,546 A | 6/1997 | Bilkadi | |
| 5,852,148 A | 12/1998 | Behr et al. | |
| 6,063,838 A | 5/2000 | Patnode et al. | |
| 6,380,149 B2 | 4/2002 | Flynn et al. | |
| 6,630,238 B2 | 10/2003 | Hyde et al. | |
| 6,632,522 B1 | 10/2003 | Hyde et al. | |
| 6,664,354 B2 | 12/2003 | Savu et al. | |
| 2009/0281002 A1 | 11/2009 | Casper | |

FOREIGN PATENT DOCUMENTS

| | | |
|---|---|---|
| EP | 0 252 372 | 1/1988 |
| EP | 0 448 902 | 10/1991 |
| EP | 0 372 756 | 12/1993 |
| EP | 1 057 861 | 12/2000 |
| EP | 1 757 629 | 2/2007 |
| GB | 1276673 | 6/1972 |
| WO | WO 92/11295 | 7/1992 |
| WO | WO 2006/093702 | 9/2006 |

OTHER PUBLICATIONS

U.S. Appl. No. 61/419,017, entitled "Moisture Curable Isobutylene Adhesive Copolymers," filed Dec. 2, 2010.
U.S. Appl. No. 61/414,492, entitled "Isobutylene (Co)polymeric Adhesive Composition," filed Nov. 17, 2010.
U.S. Appl. No. 61/414,046, entitled "UV Curable Anhydride-modified Poly(isobutylene)," filed Nov. 16, 2010.
U.S. Appl. No. 61/432,388, entitled "Methods for Treating Siliciclastic Hydrocarbon-bearing Formations with Fluorinated Amine Oxides," filed Jan. 13, 2011.
U.S. Appl. No. 61/388,283, entitled "Radiation Curable Poly (isobutylene) Adhesive Copolymers," filed Sep. 30, 2010.
U.S. Appl. No. 61/424,990, entitled "Method for Treating Carbonate Hydorcarbon-bearing Formations with Fluoorinated Amine Oxides," filed Dec. 21, 2010.
Abbate, et al., "Maleated Polyisobutylene: A Novel Toughener for Unsaturated Polyester Resins," Journal of Applied Polymer Science, vol. 58, Issue 10, pp. 1825-1837, (1995).
Chung, et al., "Butyl rubber graft copolymers: synthesis and characterization," Polymer, vol. 36, No. 18, pp. 3565-3574, 1995.
Shirai, et al., "Photoacid and photobase generators: Chemistry and applications to polymeric materials", Progress in Polymer Science, vol. 21, pp. 1-45, (1996).
PCT International Search Report, PCT/US/2012/023469, dated Apr. 2, 2012.

*Primary Examiner* — Edward Cain
(74) *Attorney, Agent, or Firm* — Kent S. Kokko

(57) ABSTRACT

Disclosed are copolymers which comprise: a) an isobutylene copolymer having grafted polymer groups, b) optionally a tackifier, and c) optionally a non-functionalized poly(isobutylene) polymer. The compositions are useful in adhesives and coatings.

18 Claims, No Drawings

ISOBUTYLENE COPOLYMER WITH GRAFTED POLYMER GROUPS

TECHNICAL FIELD

This invention relates to novel grafted isobutylene copolymers, and coating and adhesives prepared therefrom. The adhesives are characterized by exhibiting an overall balance of adhesive and cohesive characteristics and exceptional adhesion to low surface-energy substrates.

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are a wide variety of pressure sensitive adhesive (PSA) materials available today that include natural crude or synthetic rubbers, block copolymers, and acrylic ester based polymeric compositions. Central to all PSAs is a desired balance of adhesion and cohesion that is often achieved by optimizing the physical properties of the acrylic elastomer, such as glass transition temperature and modulus. For example, if the glass transition temperature ($T_g$) or modulus of the elastomer is too high and above the Dahlquist criterion for tack (storage modulus of $3\times10^6$ dynes/cm$^2$ at room temperature and oscillation frequency of 1 Hz), the material will not be tacky and is not useful by itself as a PSA material. Often in this case, low molecular weight, high $T_g$ resin polymers (tackifiers) or low molecular weight, low $T_g$ polymers (plasticizers) are often used to modulate the $T_g$ and modulus into an optimal PSA range.

SUMMARY

The copolymers of this disclosure comprise: a) an isobutylene copolymer having grafted polymer groups, b) optionally a tackifier, and c) optionally a non-functionalized poly(isobutylene) polymer. The compositions are useful in adhesives and coatings. In some embodiments, the present disclosure provides pressure-sensitive adhesive compositions comprising a) an isobutylene copolymer having grafted polymer groups, and b) a tackifier, The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3\times10^6$ dynes/cm at a frequency of 1 Hz.

In some embodiments, hot melt adhesive compositions are provided which applied to substrates from the melt. Such hot melt adhesive compositions are substantially solvent-free. Hot melt adhesives are versatile and widely used in industrial applications, such as bookbindings, cardboard boxes, plastic parts and wooden articles, among others. They are generally 100% solid adhesives with application temperatures which vary from about 150 to about 180° C., In recent years, there has been a significant increase of the usage of low surface energy, olefin-based thermoplastics (e.g., polyethylene, polypropylene, ethylene propylene diene monomer rubber (EPDM)) in automotives, paints, appliances and electronics markets. The advantages of the new materials include affordable cost, easy processibility, and excellent mechanical properties. However, this trend creates a challenge in terms of making adhesive bonds to these low energy surfaces.

When considering adhesive tapes, pressure-sensitive adhesive (PSA) tapes are the easiest to use, but for the most part, pressure-sensitive adhesives do not adhere well to low surface energy substrates. Currently the bonding to low surface-energy surfaces is achieved by priming the substrate with polar liquid followed by application of PSAs. Even after this two step process, the existing PSAs do not fulfill customer requirements. There is need to develop primerless LSE (low surface energy) PSAs at competitive cost but still with the most optimized properties.

Recently, polyisobutylene (PIB) has been considered as an attractive material for low surface energy bonding applications due to its excellent adhering properties on olefin-based thermoplastics. In addition, the excellent moisture and oxygen barrier properties of PIB suggest that PIB-based materials have potential use in electronic and photovoltaic encapsulation applications. In spite of its beneficial properties, low cohesive strength of the material has limited the uses for high shear applications. Another possible application for PIB-based material is in the medical adhesive field. Most acrylate-based PSAs are not suitable for medical application since acrylate PSAs tend to give off toxic vapors at elevated temperatures. Acrylate-based PSAs typically contain monomeric materials which, even at ordinary room temperatures, exude odors that make acrylate PSA tapes generally unsuitable for medical uses, absent removal of the volatile compounds. Polyisobutylene PSAs are often used for medical uses because they are physiologically inert, but again they tend to be deficient in internal strength.

The adhesive compositions of the present disclosure provide an improved pressure-sensitive and hot-melt adhesive composition which may be adhered to a variety of substrates, including low surface-energy (LSE) substrates, within a wide temperature range and provide good adhesive strength and holding characteristics. The adhesive compositions are easily handled, and are environmentally friendly due to the low volatile organic compound (VOC) content, such as solvents. The adhesive compositions of the present disclosure further provide a pressure-sensitive adhesive article, such as adhesive tapes and sealants.

As used herein

"Alkyl" means a linear or branched, cyclic or acylic, saturated monovalent hydrocarbon having from one to about twelve carbon atoms, e.g., methyl, ethyl, 1-propyl, 2-propyl, pentyl, and the like.

"Alkylene" means a linear unsaturated divalent hydrocarbon having from one to about twelve carbon atoms or a branched saturated divalent hydrocarbon having from three to about twelve carbon atoms, e.g., methylene, ethylene, propylene, 2-methylpropylene, pentylene, hexylene, and the like.

"Alkenyl" means a linear saturated monovalent hydrocarbon having from one to about twelve carbon atoms or a branched unsaturated hydrocarbon having from three to about twelve carbon atoms.

"Aryl" means a monovalent aromatic, such as phenyl, naphthyl and the like.

"Arylene" means a polyvalent, aromatic, such as phenylene, naphthalene, and the like.

"Aralkylene" means a group defined above with an aryl group attached to the alkylene, e.g., benzyl, 1-naphthylethyl, and the like.

"Heteroarylene" refers to a divalent group that is aromatic and heterocyclic. That is, the heteroarylene includes at least one heteroatom in an aromatic ring having 5 or 6 members. Suitable heteroatoms are typically oxy, thio, or —NR$^3$— where R$^3$ is hydrogen or an alkyl. The group can have one to five rings that are connected, fused, or a combination thereof. At least one ring is heteroaromatic and any other ring can be aromatic, non-aromatic, heterocyclic, carbocyclic, or a combination thereof. In some embodiments, the heteroarylene has up to 5 rings, up to 4 rings, up to 3 rings, up to 2 rings, or one ring. Examples of heteroarylene groups include, but are not limited to, triazine-diyl, pyridine-diyl, pyrimidine-diyl, pyridazine-diyl, and the like.

"(Hetero)hydrocarbyl" is inclusive of hydrocarbyl alkyl and aryl groups, and heterohydrocarbyl heteroalkyl and heteroaryl groups, the later comprising one or more catenary (in-chain) heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

"(Hetero)arylene is inclusive of arylene and heteroarylene.

DETAILED DESCRIPTION

The composition comprises: a) an isobutylene copolymer having pendent grafted polymer groups, b) optionally a tackifier, and c) optionally a non-functionalized poly(isobutylene) polymer.

The isobutylene copolymer having pendent grafted polymer groups may be represented by the general formula:

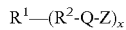    I where R$^1$ represents the polymeric isobutylene having at least 10 repeat units, R$^2$ is a covalent bond or multivalent alkylene or arylene, Q is —O—, —S—, —O—CO—, or —NR$^3$—, where R$^3$ is H or C$_1$-C$_4$ alkyl;

Z is grafted polymer of the formula:

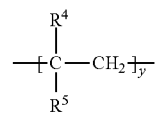    II where R$^4$ is a hydrogen or a C$_1$-C$_4$ alkyl group, R$^5$ is a (hetero)arylene group, a cyclohexyl group or an ester group, subscript y is 10 to 500;

subscript x represents a fraction of those repeat units or the isobutylene copolymer substituted by the grafted polymers. Typically 0.1 to 20 percent, preferably 1 to 5 percent, of the repeat units of the isobutylene copolymer will be substituted by the grafted polymer Z groups. The monomer units having pendent, grafted polymer Z groups may be derived from halogenated butyl rubber and are of the general formula:

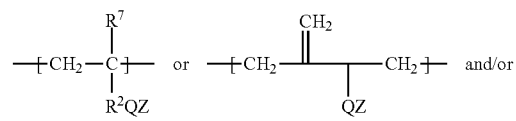

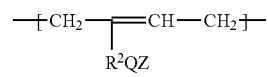

wherein R$^2$ is a covalent bond or multivalent alkylene or arylene,

Q is —O—, —NR$^3$—, where R$^3$ is H or C$_1$-C$_4$ alkyl, —S— or —O—CO—;

Z is grafted polymer of formula II.

More particularly, the isobutylene copolymer may be of the formula;

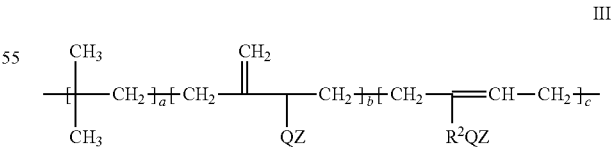    III wherein a is at least 20, and at least one of b and c are at least one, R$^2$ is a covalent bond or multivalent alkylene or arylene, Q is —O—, —S—, —O—CO—, or —NR$^3$—, where R$^3$ is H or C$_1$-C$_4$ alkyl;

Z is grafted polymer group and R$^7$ is H or CH$_3$.

Alternatively, the isobutylene copolymer may be of the formula;

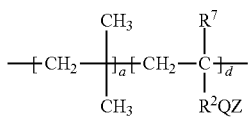
IV wherein a is at least 20, d is at least one,
$R^2$ is a covalent bond or multivalent alkylene or arylene,
Q is —O—, —S—, —O—CO—, or —NR$^3$—, where $R^3$ is H or $C_1$-$C_4$ alkyl;
Z is grafted polymer group and $R^7$ is H or $CH_3$ With respect to the copolymers of Formulas III and IV it will be recognized that the monomer units having the subscript "a" are interpolymerized isobutylene monomer units. Further, with regard to Formulas III and IV, the subscripts "b" and "c" or "d" are chosen such that the copolymer comprises 0.1 to 20 wt. % of the respective monomer units: e.g. b, c and d are such that the -Q-Z containing monomer units comprise 0.1 to 20 wt. % of the copolymer.

The copolymers of isobutylene may include those wherein isobutylene is copolymerized with another monomer, which may be subsequently modified to include the pendent grafted polymer group. Synthetic rubbers include butyl rubbers which are copolymers of mostly isobutylene with a small amount of isoprene, for example, butyl rubbers available under the tradenames VISTANEX™ (Exxon Chemical Co.) and JSR™ BUTYL (Japan Butyl Co., Ltd.). In some embodiments, the copolymers are substantially homopolymers of isobutylene, for example, polyisobutylene resins, which may be subsequently modified to include the pendent grafted polymer group, available under the tradenames OPPANOL™ (BASF AG) and GLISSOPAL™ (BASF AG). The copolymers also include copolymers of mostly isobutylene with n-butene or butadiene, which may be subsequently modified to include the pendent unsaturated group. In some embodiments, a mixture of copolymers may be used, i.e., the first polyisobutylene comprises a homopolymer of isobutylene and the second polyisobutylene comprises butyl rubber, or the first polyisobutylene comprises butyl rubber and the second polyisobutylene comprises a copolymer of isobutylene, subsequently modified. Blends of isobutylene homopolymer and modified poly(isobutylene) are also contemplated.

The isobutylene copolymer may comprise a random copolymer of isobutylene and modified paramethylstyrene units, wherein said random copolymer contains 1 to 20% by weight of said modified paramethylstyrene units and has a crosslinked structure. This random copolymer is, for example, commercially available from Exxon Chemical Co. under the trade name of EXXPRO series, and examples thereof include MDX90-10, MDX89-4. A portion of the methyl groups at the para-position of this paramethylstyrene can be brominated to form a site for the subsequent nucleophilic displacement by a compound of Formula III. Accordingly, a crosslinked structure can be formed by the technique described in detail hereinafter. Particularly, regarding the copolymer MDX90-10, 1.2% by mol of paramethylstyrene, which is contained in the copolymer in the amount of 7.5% by weight, is brominated. Regarding MDX89-4, 0.75% by mol of paramethylstyrene, which is contained in the copolymer in the amount of 5% by weight, is brominated. In addition, bromination of paramethylstyrene and random polymerization between isobutylene and paramethylstyrene, for the purpose of producing a random copolymer, can be performed by known techniques.

Paramethylstyrene monomer units can also impart heat resistance and strength to the copolymer by the cohesive force and hardness of paramethylstyrene itself. To obtain such an effect, paramethylstyrene is preferably contained in the copolymer in amounts of greater than zero, preferably about 1 to 20 parts by weight based on the total amount of the copolymer. When the amount of paramethylstyrene is smaller than 1 part by weight, the cohesive force is insufficient and it becomes difficult to obtain enough adhesion to endure practical use. On the other hand, when the amount of paramethylstyrene is larger than 20 parts by weight, the flexibility is drastically lowered and the adhesion as an important characteristics of the adhesive disappears and, therefore, it becomes impossible to refer to it as a pressure-sensitive adhesive any longer. So-called hydrogenated styrenes may also be used.

Useful isobutylene copolymers generally have the isobutylene copolymer has a molecular weight (Mw) of 10,000 to 5,000,000, preferably 50,000 to 1,000,000.

The copolymer of Formulas III and IV are generally prepared by nucleophilic displacement of commercially available halogenated PIBs, including halogenated poly(isobutylene-co-methylstyrene), halogenated poly(isobutylene-co-isoprene). Alternatively, a non-halogenated PIB-based material may be halogenated, then subsequently substituted. The halogen moiety in those materials allows introduction of the pendent grafted polymer groups using a polymers terminated with a nucleophilic group of the formula:

where $X^1$ is —O—, —S—, —OCO—, —NR$^4$—, where $R^4$ is H or $C_1$-$C_4$ alkyl; Z is an (meth)acrylate or styrenic polymer, corresponding to Formula II (supra).

The nucleophilic grafting polymer has at least one nucleophilic functional group. The reactive functional group "HX$^1$—" is capable of displacing the halogen atom of the halogenated isobutylene copolymer. For example, reactive functionalities such as amino, hydroxyl, carboxyl or mercaptan can displace the complementary halide, such as chloro-, bromo-, iodo present on the isobutylene copolymer.

The reaction scheme 1 involves a displacement reaction with a "nucleophilic polymer compound" of formula V; an organic polymer, typically a homopolymer, with at least one nucleophilic functional group. The illustrated Scheme shows the formation of the grafted —R$^2$-Q-Z moiety.

Scheme 1

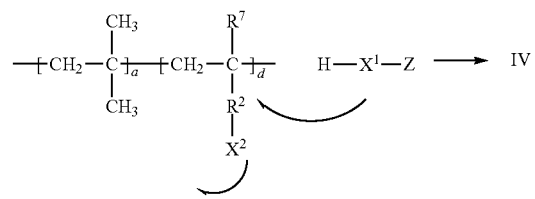

$R^7$ is H or $CH_3$,
$X^1$ is —O—, —S—, —NR$^4$—, where $R^4$ is H or $C_1$-$C_4$ alkyl or —O—CO—,
$R^2$ is a covalent bond or multivalent alkylene or arylene, preferably an alkylene or arylene group,
$X^2$ is a leaving group such as a halide, and preferably a bromide,
a is at least 20, d is at least one, $R^2$ is a covalent bond or multivalent alkylene or arylene,
Z is grafted polymer group.

The grafted polymer is generally prepared by reacting the isobutylene copolymer and the grafting polymer (having a nucleophilic terminal group), optionally in the presence of an acid or base catalyst, in a suitable organic solvent(s), typically at a temperature in the range of about 50° C.-150° C. The base should be suitably soluble in the organic solvent and is generally an alkali hydroxide. Desirably, a phase transfer catalyst may be employed. Any of such catalysts which are stable and effective under the prevailing reaction conditions may be used. Particularly preferred are the tetraalkylammonium halides, such as tetra-n-butylammonium salts. Generally the grafting polymer is added in molar excess relative to the amount of halide groups ($X^2$ in Scheme I). Most often, the ratio of equivalents of base to moles of nucleophilic groups is about 0.5-1.5:1, and the weight ratio of phase transfer catalyst to base is about 0.01-0.3:1.

The grafting polymers are prepared from monomers of the formula:

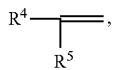

to produce grafted polymers of the formula:

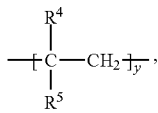

where $R^4$ is a hydrogen or a $C_1$-$C_4$ alkyl group, $R^5$ is a (hetero) arylene group, a cyclohexyl group or an ester group,
subscript y is 10 to 500; and
subscript x represents a fraction of those repeat units or the isobutylene copolymer substituted by the grafted polymers
The resultant polymer may be a homo- or copolymer.

Where $R^5$ is an ester group, it may be of the general formula —CO—O—$R^8$, where $R^8$ is an alkyl, cycloalkyl or (hetero) aryl group.

Where $R^5$ is an aryl group, it may be of the formula;

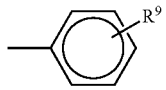

where
$R^9$ is H, an alkyl, cycloalkyl or aryl group.

Suitable esters monomers selected from (hetero)aryl and alkyl(meth)acrylates such as methyl methacrylate, ethyl methacrylate, isopropyl methacrylate, isobutyl methacrylate, tert-butyl methacrylate, tert-butyl acrylate, cyclohexyl methacrylate, phenoxyethyl acrylate, phenoxyethyl methacrylate, isobornyl methacrylate, isobornyl acrylate, phenyl methacrylate, benzyl methacrylate, nonylphenol methacrylate, cetyl acrylate, dicyclopentenyl(meth)acrylate, isobornylcyclohexyl acrylate, tetrahydrofurfuryl methacrylate, trifluoroethyl methacrylate, 1-adamantyl methacrylate, dicyclopentenyloxylethyl(meth)acrylate, dicyclopentanyl(meth)acrylate, and 3,3,5 trimethylcyclohexyl(meth)acrylate.

In some embodiments it is desirable for the (meth)acrylate ester monomer to include a high $T_g$ monomer, have a $T_g$ of at least 20° C., and preferably at least 50° C. Examples of suitable monomers useful in the present invention include, but are not limited to, t-butyl acrylate, methyl methacrylate, ethyl methacrylate, isopropyl methacrylate, isobutyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl methacrylate, N-octyl acrylamide, and propyl methacrylate or combinations.

Suitable aryl monomers include, but are not limited to, styrene, alpha-methyl styrene, alkyl substituted styrene (e.g., vinyl toluene, dimethylstyrene, ethylstyrene, isopropylstyrene, and tert-butylstyrene), and the like. Any of these aryl monomers optionally can be substituted with one or more groups selected from amino, hydroxyl, alkoxy, halo, and the like, to form the styrenic polymer.

Still other suitable ethylenically unsaturated monomers that can be used to form polymeric group Z are various vinyl monomers such as, vinyl ether monomers, vinyl aryl monomers, vinyl heterocyclic monomers, vinyl ester monomers, and the like. Suitable vinyl ether monomers include, for example, vinyl methyl ether. Suitable vinyl aryl monomers include, but are not limited to, styrene, alpha-methyl styrene, alkyl substituted styrenes (e.g., vinyl toluene, dimethylstytrene, ethylstyrene, isopropylstyrene, and tert-butylstyrene), and the like. Any of these vinyl aryl monomers optionally can be substituted with one or more groups selected from amino, hydroxyl, alkoxy, halo, and the like. Suitable vinyl heterocyclic monomers include, but are not limited to, 2-vinyl pyridine, 4-vinyl pyridine, and n-vinylcarpolactam. Suitable vinyl esters include, but are not limited to, vinyl acetate and vinyl proprionate. Monomers such as vinyl aryl monomers, vinyl heteroaryl monomers, and some vinyl ester monomers, when formed into a homopolymeric group, tend to have a glass transition temperature that is at least 20° C., at least 30° C., at least 40° C., or at least 50° C. Minor amounts of low $T_g$ monomers may be used provided the copolymer has a $T_g$ of greater than or equal to 20° C.

Useful monomers desirably have a glass transition temperature ($T_g$) that is at least 20° C., at least 30° C., at least 40° C., or at least 50° C., when polymerized into a homopolymer. The polymeric groups with a glass transition temperature that is less than 20° C. tend to be elastomeric. A useful predictor of interpolymer $T_g$ for specific combinations of various monomers can be computed by application of Fox Equation (1) (obtained from W. R. Sorenson and T. W. Campbell's text entitled "Preparative Methods of Polymer Chemistry", Interscience: New York (1968), p. 209). Specific values for $T_g$s of appropriate homopolymers can be obtained from P. Peyser's chapter in "Polymer Handbook", 3rd edition, edited by J. Brandrup and E. H. Immergut, Wiley: New York (1989), pp. VI-209 through VI-277.

The grafting polymers can be formed by either anionic polymerization or free radical polymerization. The polymerization reaction typically occurs in the presence of an initiator. Although any known initiator can be used, the initiator is often an azo compound. Suitable azo compounds include, but are not limited to, 2,2'-azobis(isobutyronitrile) commercially available under the trade designation VAZO™ 64, 2,2'-azobis (2-methylbutyronitrile) commercially available under the trade designation VAZO 67™, 2,2'-azobis(2,4-dimethylpentanenitrile) commercially available under the trade designation VAZO 52™, and 4,4'-azobis(4-cyanovaleric acid), all from DuPont (Wilmington, Del.).

The use of a carboxyl-containing initiator such as 4,4'-azobis(4-cyanovaleric acid) is often preferred because such an initiator provides grafting polymers having a terminal carboxyl group. This terminal carboxyl group may be converted to other nucleophilic terminal groups, such as hydroxyl, thiol or amine by means well known in the art. An illustrative method is described in Y. Yamashita, K. Ito, H. Mizuno and H. Okada, Polymer Journal 14, 255-260 (1982) and K. Ito, N. Usami, and Y. Yamashita, Macromolecules 13, 216-221 (1980).

The initiator is typically added in an amount in the range of 0.01 to 5 weight percent, in the range of 0.05 to 3 weight percent, in the range of 0.05 to 2 weight percent, in the range of 0.05 to 1 weight percent, or in the range of 0.1 to 1 weight percent based on the weight of monomers in the monomer composition. The amount of initiator can be used to control the weight average molecular weight of the grafting polymer.

The monomer composition used to form the grafting polymer can also include a chain transfer agent to control the molecular weight. Examples of useful chain transfer agents include, but are not limited to, carbon tetrabromide, alcohols, mercaptans, and mixtures thereof. The use of carboxyl-containing chain transfer agents such as, for example, 3-mercaptopropionic acid is often preferred. These carboxyl-containing chain transfer agent tend to provide grafting polymers having a terminal carboxyl group.

Instead of a chain transfer agent, the grafting monomer composition can include a nitroxide mediating agent such as, for example, 2,2,6,6-tetramethyl-1-piperidinyloxy (TEMPO) commercially available from Alfa Aesar (Ward Hill, Mass.), 1,1,3,3-tetraethyl-2,3-dihydro-1H-isoindolin-2-yloxyl, di-tert-butyl nitroxide, or 4-oxo-TEMPO commercially available from Alfa Aesar. The polymerization reaction is considered to be "living" or "controlled" and can be initiated and terminated as desired. The mechanism of control relies on the reversible coupling of the nitroxide mediating agent to the free radical on the active (i.e., propagating) polymer chain to form an alkoxy amine linkage. The addition of the nitroxide mediating agent makes the polymer chain dormant and unable to further propagate. At certain temperatures, however, the alkoxy amine linkage can be cleaved allowing the polymer chain to become active and continue to grow. Thus, equilibrium between active and dormant polymer chains can be controlled though the selection of the temperature range that is used for polymerization. The temperature range is typically in the range of 100° C. to 160° C. The resulting polymeric material tends to have a relatively narrow molecular weight distribution.

Nitroxide mediating agents are often used in the polymerization of monomers such as styrene. When a nitroxide compound is used, one terminus of the grafting polymer is often a group derived from the initiator and the other terminus can be the nitroxide compound. At least one of these is typically selected to provide acid functionality (e.g., a carboxyl group). For example, if the initiator is 4,4'-azobis(4-cyanovaleric acid) and the nitroxide mediating agent TEMPO are used, one end of the polymer is usually the group —NH—C(CN)(CH$_3$)—CH$_2$—CH$_2$—COOH. In this example, the carboxyl group is provided by the initiator.

In some cases the nitroxide mediating agent and the initiating species can be obtained from one compound. For example, some alkoxyamine compounds can decompose at a particular temperature to yield both an initiating radical and a nitroxide radical. Such an initiator is described in an article by Messerschmidt et al. (*Macromolecules*, 41 (2008)). The initiating species from the decomposed alkoxyamine also may have a carboxyl group, leaving the generated polymeric group with a carboxyl group at one end of the chain. The other end of the chain is capped with the nitroxide portion of the decomposed alkoxyamine compound. One such compound described in articles by Leenen et al. (e-Polymers, number 71 (2005)) and Dufils et al. (*Polymer*, 48 (2007)), is 2-methyl-2-(N-tert-butyl-N-(1' diethylphosphono-2,2'-dimethylpropyl) aminoxyl)propanoic acid.

When a nitroxide mediating agent is used, the polydispersity index is often in the range of 1.0 to 1.4, in the range of 1.0 to 1.3, or in the range of 1.0 to 1.2. If a non-living polymerization method is used such as when a traditional chain transfer agent is used in place of a nitroxide mediated agent, the polydispersity index is often in the range of 1.5 to 10.0, in the range of 1.5 to 6.0, in the range of 1.5 to 4, in the range of 1.5 to 2.0, in the range of 1.5 to 2.0, or in the range of 1.6 to 2.0.

Alternatively, the grafting polymers may be is prepared by anionic polymerization of a polymerizable monomer to form a living polymer. Such monomers include those corresponding to the polymer of Formula II. Illustrative species include vinyl aromatic compounds such as styrene, α-methylstyrene, vinyltoluene and its isomers or non-aromatic vinyl compounds such as methyl methacrylate. Living polymers are conveniently prepared by contacting the monomer with an alkali metal hydrocarbon or alkoxide salt in the presence of an inert organic diluent.

The initiators for anionic polymerization may be any of the alkali metal hydrocarbons or alkoxide salts which produce a mono-functional living polymer, i.e., only one end of the polymer contains a reactive ion. Such initiators include the hydrocarbons of lithium, sodium or potassium, for example, having an alkyl radical containing up to 20 carbon atoms or more, and preferably up to 8 carbon atoms. Illustrative alkali metal hydrocarbons include ethylsodium, propylsodium, butylpotassium, octylpotassium, phenylsodium, ethyllithium, butyllithium, sec-butyllithium, isobutyllithium, tert-butyllithium and 2-ethylhexyllithium. Sec-butyllithium is the preferred initiator.

The amount of initiator usually dictates the molecular weight of the living polymer. If a small portion of initiator is used, with respect to the amount of monomer, the molecular weight of the living polymer will generally be larger than if a small proportion of initiator is used. Generally, the initiator concentration can vary from about 0.01 to about 0.1 mole of active alkali metal per mole of monomer, or higher. Preferably, the initiator is used in amounts to provide a grafting polymer having 10 to 500, preferably 50 to 250, repeat units, or about 5000 to 50,000 $M_w$.

The living polymers may be terminated in several ways to provide the requisite terminal nucleophilic group. One means is by capping with a suitable capping agent, which include lower alkylene oxides such as ethylene and propylene oxide, to provide terminal nucleophilic hydroxyl groups, or aziridine compounds, to provide terminal amine groups.

The capping reaction is carried out, as in the case of the terminating reaction, by adding the capping reactant to the living polymer at the polymerization temperature. A slight molar excess of the capping reactant with respect to the amount of initiator may be used. The reaction occurs on a mole for mole basis. This reaction is described in U.S. Pat. No. 3,842,059 (Milkovich).

The molecular weights of the isobutylene polymer and the grafting polymer of Formula II, may be varied as desired. In addition, the degree of substitution of the isobutylene polymer by the grafting polymer may be varied as desired.

It is believed that the grafted polymer groups phase separate from the isobutylene polymer. This phase separation results in the formation of separate domains of the grafted polymer that function as physical crosslinks for the isobutylene copolymer. The grafted copolymer can be used as an adhesive such as a pressure sensitive adhesive. The cohesive strength of the adhesive tends to increase with the introduction of more grafted groups. Generally 0.01 to 20 percent, preferably 0.1 to 5 percent, of the repeat units of the polymeric isobutylene is substituted by grafted polymer groups. Put differently, the weight percent of the grafting polymer in the grafted polymer is generally 0.01 to 20 wt. %.

Physical crosslinking typically relies on the natural or induced formation of entanglements within the grafted polymeric chains and tends to increase the cohesive strength of adhesive compositions such as pressure-sensitive adhesive compositions. Physical crosslinking is often desired because the pressure-sensitive adhesive can be processed in a melted state at relatively high temperatures yet can take on a crosslinked form at lower temperatures. That is, the pressure-sensitive adhesives can be used as hot melt adhesives. In contrast, chemical crosslinked pressure-sensitive adhesives typically cannot be processed as hot melt adhesives. Hot melt processing is often considered desirable because the use of inert organic solvents can be minimized or eliminated. The minimization or elimination of inert organic solvents can be desirable from both an environmental and economic perspective.

To phase separate from the isobutylene polymer and to provide physical crosslinking, the grafting polymer is often selected to be immiscible in the isobutylene polymer at ambient temperatures. Physical crosslinking is enhanced when the grafting polymer has a glass transition temperature greater than or equal to at least 20° C. To form such a grafting polymer, the monomers used are selected to have a glass transition temperature equal to at least 20° C. (when polymerized as a homopolymer).

In addition to the glass transition temperature, the molecular weight of the grafting polymer can affect whether or not the grafted isobutylene copolymer will phase separate and physically crosslink. Phase separation and entanglement is more likely if the molecular weight of the grafting polymer has a weight average molecular weight of at least 5000 grams/mole. The weight average molecular weight of the grafting polymer is often greater than 7,500 grams/mole, greater than 10,000 grams/mole, greater than 12,000 grams/mole, greater than 15,000 grams/mole, or greater than 20,000 grams/mole. Cohesive strength of the pressure-sensitive adhesive tends to increase as the weight average molecular weight of the grafting polymer increases.

If higher molecular weight of the grafting polymer becomes too large, however, the number of grafted polymer groups formed on a weight basis by reaction with the isobutylene may be diminished. That is, as the molecular weight of the grafting polymer increases, it can become more difficult to achieve a high degree of substitution of grafted polymer groups on a weight basis. The weight average molecular weight of grafting polymer is often up to 150,000 grams/mole. For example, the weight average molecular weight can be up to 120,000 grams/mole, up to 100,000 grams/mole, up to 80,000 grams/mole, up to 60,000 grams/mole or up to 40,000 grams/mole.

The compositions of this disclosure optionally further comprise non-functional poly(isobutylene) polymers. The unfunctionalized isobutylene (co)polymeric synthetic rubbers are generally resins having a polyisobutylene main or a side chain. In some embodiments, the isobutylene (co)polymers are substantially homopolymers of isobutylene, for example, poly(isobutylene) resins available under the tradenames OPPANOL™ (BASF AG) and GLISSOPAL™ (BASF AG). In some embodiments, the isobutylene (co)polymeric resins comprise copolymers of isobutylene, for example, synthetic rubbers wherein isobutylene is copolymerized with another monomer. Synthetic rubbers include butyl rubbers which are copolymers of mostly isobutylene with a small amount of isoprene, for example, butyl rubbers available under the tradenames VISTANEX™ (Exxon Chemical Co.) and JSR™ BUTYL (Japan Butyl Co., Ltd.). Synthetic rubbers also include copolymers of mostly isobutylene with n-butene or butadiene. In some embodiments, a mixture of isobutylene homopolymer and butyl rubber may be used, i.e., a first polyisobutylene comprises a homopolymer of isobutylene and the second polyisobutylene comprises butyl rubber, or a first polyisobutylene comprises butyl rubber and a second polyisobutylene comprises a homopolymer of isobutylene.

The unfunctionalized isobutylene (co)polymeric synthetic rubber (e.g. PIB) material typically has substantially higher molecular weight than the amine-functionalized (e.g. PIB) synthetic rubber material (described further below). In some embodiments, the weight average molecular weight ($M_w$) of the unfunctionalized isobutylene (co)polymeric synthetic rubber (e.g. PIB) is at least 35,000 grams per mole, at least 100,000 grams per mole, at least 250,000 grams per mole, at least 500,000 grams per mole, or even at least 1,000,000 grams per mole. The weight average molecular weight is typically no greater than 4,000,000 g/mole.

The unfunctionalized isobutylene (co)polymeric synthetic rubber can be a homopolymer, copolymer, or a mixture thereof. Copolymers can be random or block copolymers. Block copolymers can include the polyisobutylene sections in the main backbone, in a side chain, or in both the main backbone and a side chain of the polymer. The polyisobutylene material is typically prepared by polymerizing isobutylene alone or by polymerizing isobutylene plus additional ethylenically unsaturated monomers, such as isoprene, in the presence of a Lewis Acid catalyst such as aluminum chloride, boron trichloride (with titanium tetrachloride as a co-catalyst), or boron trifluoride.

Unfunctionalized isobutylene (co)polymeric rubbers are commercially available from several manufacturers. Homopolymers are commercially available, for example, under the trade designation OPPANOL™ (e.g., OPPANOL™ B10, B15, B30, B50, B80, B100, B150, and B200) from BASF Corp. (Florham Park, N.J.). These polymers often have a weight average molecular weight ($M_w$) in the range of about 35,000 to 4,000,000 grams per mole. Still other exemplary homopolymers are commercially available from United Chemical Products (UCP) of St. Petersburg, Russia in a wide range of molecular weights. For example, homopolymers commercially available from UCP under the trade designation SDG have a viscosity average molecular weight ($M_v$) in the range of about 35,000 to 65,000 grams per mole. Homopolymers commercially available from UCP under the trade designation EFROLEN™ have a viscosity average molecular weight (My) in the range of about 480,000 to about 4,000,000 grams per mole. Homopolymers commercially available from UCP under the trade designation JHY™ have a viscosity average molecular weight in the range of about 3000 to about 55,000 grams per mole. These homopolymers typically do not have reactive double bonds. It is appreciated that the unfunctionalized (e.g. PIB) synthetic rubber may have a very small concentration of reactive double bonds or other functional groups that are residual to the polymerization thereof. The concentration of such reactive double bonds or other functional groups is typically less than 5, 4, 3, or 2 mol %. Such olefinic unsaturations are also typically not suitable functional groups for formation of covalent bonds via free-radical polymerization.

The concentration of unfunctionalized isobutylene (co) polymeric synthetic rubber material in the composition is typically less than 50 wt. %, preferably greater than 10 wt. %, relative to the total weight of the composition.

Conventional adhesives do not adhere well to certain substrates, such as certain types of automotive paints and low energy surfaces. Efforts have been made to improve the adhesion of adhesives, i.e., develop more aggressive tack, to these types of surfaces; tackifying the base polymer is commonly practiced.

Various types of tackifiers include phenol-modified terpenes and rosin esters such as glycerol esters of rosin and pentaerythritol esters of rosin that are available under the trade names Nuroz™, Nutac™ (Newport Industries), Permalyn™, Staybelite™, Foral™ (Eastman). Also available are hydrocarbon resin tackifiers that typically come from C5 and C9 monomers by products of naphtha cracking and are available under the trade names Piccotac™, Eastotac™, Regalrez™, Regalite™ (Eastman), Arkon™ (Arakawa), Norsolene™, Wintack™ (Cray Valley), Nevtack, LX (Neville Chemical Co.), Hikotack™, Hikorez™ (Kolon Chemical), Novares™ (Rutgers N.V.), Quintone™ (Zeon), Escorez™ (Exxonmobile Chemical), Nures™, and H-Rez™ (Newport Industries).

Conventional tackified pressure-sensitive adhesives can also appear cloudy, demonstrating a loss in the characteristic transparency found in many conventional pressure-sensitive adhesive compositions. The cloudiness is an indication of limited or incomplete compatibility of the tackifier and the polymers. The reduced compatibility can lead to a degradation of adhesive properties on aging, as evidenced by a loss of tack or reduced peel adhesion. In some cases, the addition of a tackifier to an adhesive composition can be clear and appear to be compatible. However, after removing the solvent, curing the adhesive, or on aging, the adhesive can become cloudy, indicating some incompatibility between the tackifier and acrylic base polymer.

In many embodiments, the present disclosure provides tackified adhesive compositions that overcome problems noted in the art. The tackifier is preferably selected from a material that is essentially free of any ethylenically or acetylenically unsaturated bonds. The tackifier includes, but is not limited to, hydrogenated rosin resins, hydrogenated and esterified rosin resins, hydrogenated terpene resins, aliphatic petroleum resins, aromatic petroleum resins, alicyclic petroleum resins obtained by hydrogenating aromatic petroleum resins, and the like. Preferably, the tackifier used is selected from hydrogenated $C_9$ petroleum resins such as but not limited to Regalrez™ tackifiers (Eastman) or Arkon™ (Arakawa) tackifiers. Such "hydrophobic tackifiers", may be used in amounts of greater than zero, typically less than 50 wt. %, preferably greater than 1 wt. %, relative to the total weight of the composition.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid poly(isobutylenes) such as Glissopal™, and the like, waxes, and mixtures of oils. A plasticizer may be present in the pressure sensitive adhesive of the present invention in an amount of from is typically less than 30 wt. %, preferably greater than 1 wt. %, relative to the total weight of the composition.

In many embodiments, the adhesive composition may comprise:
a) greater than 30 wt. %, preferably greater than 50 wt. %, isobutylene copolymer having pendent polymer Z groups;
b) 0 to 50 wt. % of tackifier, preferably 1 to 50 wt. %, and
c) 0 to 50 wt. % non-functional poly(isobutylene), preferably 10 to 50 wt. %.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thickness may vary, but a coating thickness of 2-500 microns (dry thickness), preferably about 25 to 250 microns, is contemplated.

In some embodiments, the adhesive compositions, particularly pressure-sensitive adhesive compositions, are applied as a solvent solution or dispersion, the solvent evaporated, and the adhesive composition crosslinked on moisture. Suitable solvents such as alkanes, ethyl acetate, toluene and tetrahydrofuran which are unreactive with the functional groups of the components of the copolymer The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are polypropylene, polyethylene (e.g., high density polyethylene or HDPE), polystyrene and poly(methyl methacrylate) (PMMA). Other substrates may also have properties of low surface energy due to a residue, such as an oil residue or a film such as paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics, glass and metals.

The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single-coated or double-coated tape in which the adhesive is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference. Those skilled in the art will also know that other additives such as fillers, antioxidants, stabilizers, and colorants may be blended with the adhesive for beneficial properties.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

EXAMPLES

Test Methods

90° Angle Peel Adhesion Strength Test

Peel adhesion strength was measured at a 900 angle using an IMASS SP-200 slip/peel tester (available from IMASS, Inc., Accord Mass.) at a peel rate of 305 mm/minute (12 inches/minute) using the procedure described in ASTM International standard, D3330, Method F. Test panels were prepared by wiping the panels with a tissue wetted with the corresponding solvents shown in Table 1 using heavy hand pressure to wipe the panel 8-10 times. This procedure was repeated two more times with clean tissues wetted with solvent. The cleaned panel was allowed to dry. The adhesive tape was cut into strips measuring 1.27 cm×20 cm (½ in.×8 in.) and the strips were rolled down onto the cleaned panel with a 2.0 kg (4.5 lb.) rubber roller using 2 passes. The prepared samples were stored at 23° C./50% RH for 24 hours before testing. Two samples were tested for each example and averaged values were expressed in N/dm. Failure mode was noted and recorded as COH—cohesive, i.e., the adhesive split leaving residue on both the tape and test surface, ADH—adhesive, i.e., the adhesive peeled cleanly from the test surface.

TABLE 1

Peel Adhesion Test Panel Materials

| Material | Solvent |
| --- | --- |
| HDPE—High density polyethylene | Isopropyl alcohol |
| PP—Polypropylene | Isopropyl alcohol |
| EPDM—Ethylene/propylene/diene monomer copolymer | Isopropyl alcohol |
| Thermoplastic Elastomer (TPE) based on EPDM and polypropylene | Isopropyl alcohol |
| SS—Stainless Steel | Heptane |
| Glass—Soda-lime glass | Heptane |

Static Shear Strength

The static shear strength was evaluated as described in the ASTM International standard, D3654, Procedure A at 23° C./50% RH (relative humidity) using a 1000 g load. Tape test samples measuring 1.27 cm×15.24 cm (½ in.×6 in.) were adhered to 1.5 inch by 2 inch stainless steel (SS) panels using the method to clean the panel and adhere the tape described in the peel adhesion test. The tape overlapped the panel by 1.27 cm×2.5 cm. and the strip was folded over itself on the adhesive side, and then folded again. A hook was hung in the second fold and secured by stapling the tape above the hook. The weight was attached to the hook and the panels were hung in a 23° C./50% RH room. The time to failure in minutes was recorded. If no failure was observed after 10,000 minutes, the test was stopped and a value of >10,000 minutes was recorded. The mode of failure described in the peel adhesion test was also noted.

Materials Used for Examples

The following materials are available from ExxonMobil Corporation (Baytown, Tex.)

ESCOREZ™ 1310—hydrocarbon based tackifier

ESCOREZ™ 5340—cycloaliphatic hydrocarbon based tackifier

The following material is available from Lanxess Corporatin (Akron, Ohio)

Lanxess Bromobutyl™ 2030—Brominated poly(isoprene-co-isoprene)

The follow materials are available from Sigma Aldrich (St. Loius, Mo.)

2,2,6,6-tetramethyl-1-piperidinyloxy (TEMPO)

Tetrabutylammonium hydroxide (TBAH) 40% in $H_2O$

3-Mercaptopropionic acid (MPA)

4,4' Azobis(4-cyanovaleric acid)

Tetrabutylammonium bromide

Other Materials Used

OPPANOL™ B15 polymer-polyisobutylene (Medium MW 80K g/mol unfunctionalized synthetic rubber) available from (BASF, Florham Park N.J.)

GLISSOPAL™ 1000—unfunctionalized polyisobutylene (Low MW 1000 g/mol) available from BASF, Florham Park, N.J.

Inhibitor Removal Resin (CAS #9003-70-7) available from Alpha Aesar (Ward Hill, Mass.)

Styrene monomer available from Alpha Aesar (Ward Hill, Mass.)

Methyl methacrylate monomer available from Alpha Aesar (Ward Hill, Mass.)

Hostaphan™ 3SAB-primed polyester film available from Mitsubishi, Greer S.C.

Preparation of Grafting Polymers

All percents are based on weight unless otherwise indicated. Inhibitor removal from the monomers was done by passing the monomers slowly through a column packed with Inhibitor Removal Resin (CAS #9003-70-7) from Alpha Aesar (Ward Hill, Mass.). Monomers treated in this manner are referred to as "treated monomers".

Preparation 1

Acid Terminated Polystyrene Grafting Polymer 1

An acid terminated polystyrene polymer (PS) was prepared by adding 100 grams of treated styrene monomer, 2.5 grams of 4,4' azobis(4-cyanovaleric acid) initiator, 1.0 grams of 2,2,6,6-tetramethyl-1-piperidinyloxy (TEMPO), and 25 g of xylenes solvent to a 250 mL multi-neck flask that was fitted with a condenser, mechanical stirrer, and nitrogen purge line. The flask was sealed with a rubber septum, mixed, and then bubbled with nitrogen for 30 minutes. The flask was then placed in an oil bath at 145° C. and held at that temperature for 10 hours while stirring. During the reaction, the initially red solution changed to a light yellowish color and the solid initiator dissolved. The product was cooled and a sample was taken for both GPC and H-NMR analysis. By GPC analysis, the conversion of styrene monomer was approximately 85% and the weight average molecular weight (Mw) of the polymer was approximately 13,500 grams/mole with a polydispersity of 1.3. The product was then slowly added to 6 fold (by volume) excess of cold methanol. The precipitated acid terminated polystyrene polymer was filtered, collected, and dried under vacuum for 24 hours.

Preparation 2

Acid Terminated poly(methylmethacrylate) Grafting Polymers 2-5

An acid-terminated poly(methylmethacrylate) polymer (PMMA) was prepared by adding 74 grams of methyl methacrylate (MMA), 1.0 grams of 3-mercaptopropionic acid (MPA), 0.41 grams of thermal initiator (4,4' azobis(4-cyanovaleric acid)), 65 grams of toluene, and 10 g of ethyl acetate to a narrow necked glass bottle containing a magnetic stir bar, mixing well, and then bubbling with nitrogen for 30 minutes. The bottle was then sealed and placed in a rotating and heated water bath at 70° C. for 24 hours. The water bath was sold under the trade designation Launder-O-meter by Atlas, Inc. (Athens, Ga.). The resulting solution was slowly added to 6 fold (by volume) excess of cold methanol. The precipitated acid-terminated poly(methylmethacrylate) polymer was filtered, collected, and dried under vacuum for 24 hours. Based on GPC analysis, the weight average molecular weight of the acid terminated poly(MMA) product was approximately 12,900 grams/mole with a polydispersity index of 1.59.

Additional acid terminated poly(methylmethacrylate) polymers were generated using the method and amounts above except that the amount of chain transfer agent (MPA) was varied to alter the Mw of the resulting product. The results for Preparatory Examples 2-5 are shown below in Table 2.

TABLE 2

| Acid Terminated Poly(methylmethacrylate) Polymers | | | |
|---|---|---|---|
| Material | MPA (g) | Mw (g/mole) | PDI |
| Grafting Polymer 2 | 1.0 | 12,900 | 1.59 |
| Grafting Polymer 3 | 4.0 | 5,100 | 1.50 |
| Grafting Polymer 4 | 1.6 | 10,000 | 1.60 |
| Grafting Polymer 5 | 0.76 | 14,400 | 1.55 |

Polymer Grafted Polyisobutylene

Preparation 3

Procedure for Synthesizing Polystyrene Grafted PIB (Grafted Polymer 1)

In a three-neck, round-bottomed flask equipped with a reflux condenser, thermometer, and a nitrogen inlet, brominated poly(isobutylene-co-isoprene) (Lanxess Bromobutyl 2030) (17.00 g, Br content: $3.88 \times 10^{-3}$ mol) and toluene (96.30 g) were charged and stirred with a magnetic stir bar under nitrogen at room temperature until the polymer completely dissolves. In a 20 mL glass vial, 3 g of carboxylic acid terminated polystyrene grafting polymer 1 (PS, Mw=13,500 g/mol) and 10 g of THF were charged and stirred with a magnetic bar until they form a transparent solution. When a homogeneous solution was obtained, 0.216 g of tetrabutylammonium hydroxide (TBAH, 40 wt. % in $H_2O$) was slowly added to the solution. The solution was thoroughly stirred with a magnetic stir bar for at least 10 min and was added to the previously prepared brominated poly(isobutylene-co-isoprene)-toluene solution. Once all the components completely added, the flask was heated to 105° C. After 4 hours, the reaction was cooled to room temperature and was poured into acetone to coagulate the modified polymer. The isolated polymer was washed with fresh acetone three times to remove the residual catalyst and ungrafted PS polymer 1. The polymer was then filtered and was dried in a vacuum oven for 12 hours at 50° C., and then cooled to room temperature. Based on NMR analyses, the grafted PS grafting polymer 1 content was 7.4 wt. %.

Preparation 4

Procedure for Synthesizing poly(methylmethacrylate) Grafted PIB (Grafted Polymer 2)

In a three-neck, round-bottomed flask equipped with a reflux condenser, thermometer, and a nitrogen inlet, brominated poly(isobutylene-co-isoprene) (Lanxess Bromobutyl 2030) (17.00 g, Br content: $3.88 \times 10$ mol) and toluene (96.30 g) were charged and stirred with a magnetic stir bar under nitrogen at room temperature until the polymer completely dissolves. In a 20 mL glass vial, 3 g of carboxylic acid terminated poly(methylmethacrylate) grafting polymer 2 (Mw=12,900 g/mol) and 10 g of THF were charged and stirred with a magnetic bar until they form a transparent solution. When a homogeneous solution was obtained, 0.226 g of tetrabutylammonium hydroxide (TBAH, 40 wt. % in $H_2O$) was slowly added to the solution. The solution was thoroughly stirred with a magnetic stir bar for at least 10 min and was added to the previously prepared brominated poly (isobutylene-co-isoprene)-toluene solution. Once all the components completely added, the flask was heated to 105° C. After 4 hours, the reaction was cooled to room temperature and was poured into acetone to coagulate the modified polymer. The isolated polymer was washed with fresh acetone three times to remove the residual catalyst and ungrafted PMMA polymer 2. The polymer was then filtered and was dried in a vacuum oven for 12 hours at 50° C., and then cooled to room temperature. Based on NMR analyses, the grafted PMMA polymer 2 content was 5.9 wt. %.

Preparation 5

Procedure for Synthesizing poly(methylmethacrylate) Grafted PIB (Grafted Polymer 3)

In a three-neck, round-bottomed flask equipped with a reflux condenser, thermometer, and a nitrogen inlet, brominated poly(isobutylene-co-isoprene) (Lanxess Bromobutyl 2030) (15.00 g, Br content: $3.42 \times 10^{-3}$ mol), grafting polymer 3 (Mw=5,100, 2.65 g), tetrabutylammoniumbromide (TBAB, 0.55 g) and toluene (85.00 g) were charged and stirred with a magnetic stir bar under nitrogen at room temperature. Once all the components completely dissolved, the flask was heated to 105° C. After 4 hours, the reaction was cooled to room temperature and was poured into acetone to coagulate the modified polymer. The isolated polymer was washed with fresh acetone three times to remove the residual catalyst and ungrafted PMMA polymer 3. The grafted polymer was then filtered and was dried in a vacuum oven for 12 hours at 50° C., and then cooled to room temperature. Based on NMR analyses, the grafted PMMA polymer content was 1.37 wt. %.

Preparation 6

Procedure for Synthesizing poly(methylmethacrylate) grafted PIB (Grafted Polymer 4)

Grafted Polymer 4 was synthesized by following the procedure in Grafted Polymer 3 preparation except Grafting Polymer 4 was used instead of Grafting Polymer 3. Based on NMR analyses, the grafted PMMA polymer content was 1.28 wt. %.

Preparation 7

Procedure for Synthesizing poly(methylmethacrylate) grafted PIB (Grafted Polymer 5)

Grafted Polymer 5 was synthesized by following the procedure in Grafted Polymer 3 preparation except Grafting Polymer 5 was used instead of Grafting Polymer 3. Based on NMR analyses, the grafted PMMA polymer content was 1.57 wt. %.

Examples 1-3 and Control Compositions C1-C3

Adhesive compositions were prepared by placing different amounts of polystyrene-grafted polyisobutylene (Grafted Polymer 1) and an unfunctionalized, medium molecular weight polyisobutylene (OPPANOL B15). The total amount of polyisobutylene in the system remained at 100 parts, but the amount of the modified and unmodified polyisobutylene was varied and shown in Table 3 in parts (parts per 100 parts of polymer). All compositions were prepared with 400 parts of toluene and the amounts of ESCOREZ 1310 tackifier and Glissopal 1000 plasticizer were both maintained at 10 pph. Each adhesive composition was placed in a 100 ml jar and mixed on a roller mill overnight.

TABLE 3

Adhesive Compositions

| Ex | Grafted Polymer 1 (parts) | Lanxess 2030 Bromo butyl rubber (parts) | Oppanol B15 PIB (pph) | Escorez 1310 (pph) | Glissopal 1000 (pph) |
|---|---|---|---|---|---|
| 1 | 100 | 0 | 0 | 10 | 10 |
| 2 | 70 | 0 | 30 | 10 | 10 |
| 3 | 40 | 0 | 60 | 10 | 10 |
| C1 |  | 100 | 0 | 10 | 10 |
| C2 |  | 70 | 30 | 10 | 10 |
| C3 |  | 40 | 60 | 10 | 10 |

The resulting composition was knife-coated onto a 6 inch by 25 inch strip of polyester film backing (Hostaphan™ 3SAB) to a thickness of about 15 mils wet. The coated film was dried in an oven set at 70° C. for 20 minutes to provide a tape having an adhesive coating thickness of 2 mils. Control compositions having the same amounts and types of tackifiers and plasticizers with unmodified brominated poly(isobutylene-co-isoprene) (Lanxess Bromobutyl 2030) in toluene were also prepared (C1, C2, C3) and coated into tapes.

All tapes (Example 1, 2, 3, C1, C2, and C3) were conditioned at 23° C., 50% RH for 24 hours before testing for 90° Peel Adhesion and shear strength. Adhesion and shear test results are shown in Table 4 and 5, respectively.

TABLE 4

Adhesive Properties

| Ex | 90° Peel Adhesion (N/dm) | | | | | | Failure Mode |
|---|---|---|---|---|---|---|---|
|  | HDPE | PP | EPDM | Santoprene | SS | Glass |  |
| 1 | 16 | 22 | 62 | 72 | 41 | 42 | ADH |
| 2 | 19 | 10 | 61 | 93 | 39 | 38 | ADH, COH |
| 3 | 21 | 13 | 77 | 72 | 52 | 51 | ADH, COH |
| C1 | 5 | 7 | 43 | 73 | 28 | 25 | ADH, COH |
| C2 | 16 | 57 | 39 | 106 | 51 | 38 | COH |
| C3 | 21 | 59 | 83 | 73 | 50 | 46 | COH |

TABLE 5

Shear Properties

| Ex | Room Temp Shear (min) | Failure Mode |
|---|---|---|
| 1 | >10,000 | None |
| 2 | 1,000 | COH |
| 3 | 80 | COH |
| C1 | 840 | COH |
| C2 | 160 | COH |
| C3 | 40 | COH |

Examples 4-6

Adhesive compositions and tapes for Examples 4-6 were prepared as described in Examples 1-3, respectively, except that the modified PIB was Grafted Polymer 2. Test results for shear at 23° C., 50% RH and peel adhesion are shown in Table 6.

TABLE 6

Tape Adhesive Properties with Grafted Polymer 2

| Ex | Room Temp Shear (min) | Failure Mode | 90° Peel Adhesion (N/dm) | | | | | | Failure Mode |
|---|---|---|---|---|---|---|---|---|---|
| | | | HDPE | PP | EPDM | Santoprene | SS | Glass | |
| 4 | >10,000 | None | 6 | 12 | 44 | 32 | 39 | 41 | ADH |
| 5 | >10,000 | None | 8 | 21 | 57 | 73 | 47 | 41 | ADH |
| 6 | 180 | COH | 25 | 21 | 69 | 87 | 56 | 55 | ADH, COH |

Examples 7-8

Adhesive compositions and tapes for Examples 7-8 were prepared similarly as described in Examples 1-2, respectively, except used polymer and tackifier. Grafted Polymer 3 and Escorez™ 5340 were used instead of Grafted Polymer 1 and Excorez™ 1310, respectively. Adhesive compositions are summarized in Table 7 and the test results for shear at 23° C., 50% RH and peel adhesion are shown in Table 8.

TABLE 7

Adhesive Compositions

| Ex | Grafted Polymer 3 (parts) | Oppanol ™ B15 PIB (pph) | Escorez ™ 5340 (pph) | Escorez ™ 1310 (pph) |
|---|---|---|---|---|
| 7 | 100 | 0 | 20 | 0 |
| 8 | 70 | 30 | 20 | 0 |

TABLE 8

Tape Adhesive Properties with Grafted Polymer 3

| Ex | Room Temp Shear (min) | Failure Mode | 90° Peel Adhesion (N/dm) | | | | | | Failure Mode |
|---|---|---|---|---|---|---|---|---|---|
| | | | HDPE | PP | EPDM | Santoprene | SS | Glass | |
| 7 | >10,000 | None | 24 | 63 | 59 | 98 | 64 | 34 | ADH |
| 8 | 1,400 | COH | 30 | 59 | 58 | 132 | 64 | 53 | ADH, COH |

Examples 9-10

Adhesive compositions and tapes for Examples 9-10 were prepared as described in Examples 7-8, respectively, except that the modified PIB was Grafted Polymer 4. Test results for shear at 23° C., 50% RH and peel adhesion are shown in Table 9.

TABLE 9

Tape Adhesive Properties with Grafted Polymer 4

| Ex | Room Temp Shear (min) | Failure Mode | 90° Peel Adhesion (N/dm) | | | | | | Failure Mode |
|---|---|---|---|---|---|---|---|---|---|
| | | | HDPE | PP | EPDM | Santoprene | SS | Glass | |
| 9 | 6,500 | COH | 26 | 52 | 52 | 91 | 66 | 45 | ADH |
| 10 | 1,000 | COH | 30 | 75 | 54 | 114 | 63 | 56 | ADH, COH |

Examples 11-12

Adhesive compositions and tapes for Examples 11-12 were prepared as described in Examples 7-8, respectively, except that the modified PIB was Grafted Polymer 5. Test results for shear at 23° C., 50% RH and peel adhesion are shown in Table 10.

TABLE 10

| | | | | | | | | |
|---|---|---|---|---|---|---|---|---|
| Tape Adhesive Properties with Grafted Polymer 5 | | | | | | | | |
| | Room Temp | Failure | 90° Peel Adhesion (N/dm) | | | | | Failure |
| Ex | Shear (min) | Mode | HDPE | PP | EPDM | Santoprene | SS | Glass | Mode |
| 11 | 4,100 | COH | 24 | 68 | 76 | 92 | 58 | 52 | ADH, COH |
| 12 | 700 | COH | 26 | 64 | 63 | 124 | 55 | 31 | ADH, COH |

The invention claimed is:

1. An adhesive composition comprising a grafted isobutylene copolymer composition of the formula:

$$R^1-(R^2-Q-Z)_x$$

where $R^1$ represents the isobutylene copolymer having at least 20 repeat units, $R^2$ is a covalent bond or multivalent alkylene or arylene,
Q is —O—, —NR$^3$—, where $R^3$ is H or $C_1$-$C_4$ alkyl, —S— or —O—CO—;
Z is a grafted polymer having a $T_g$ of ≥20° C.;
and further comprising a non-functionalized poly(isobutylene) polymer, wherein subscript x represents a fraction of those repeat units of the isobutylene copolymer that are substituted by the grafted polymers and wherein this fraction is 0.001 to 0.20.

2. The adhesive composition of claim 1 wherein Z is grafted polymer of the formula:

$$-\!\!\left[\begin{array}{c}R^4\\|\\C-CH_2\\|\\R^5\end{array}\right]_y-$$

where $R^4$ is a hydrogen or a $C_1$-$C_4$ alkyl group, $R^5$ is a (hetero)aryl group, a cyclohexyl group or an ester group, subscript y is 10 to 500.

3. The adhesive composition of claim 2 where $R^4$ is H and $R^5$ is formula;

[phenyl ring with $R^9$ substituent]

where
$R^9$ is H, an alkyl, cycloalkyl or aryl group.

4. The adhesive composition of claim 2 where $R^5$ is —CO—O—$R^8$, where $R^8$ is an alkyl, cycloalkyl or aryl group.

5. The adhesive composition of claim 1 wherein 0.01 to 20 percent of the repeat units of the isobutylene copolymer are substituted by grafted polymer groups.

6. The adhesive composition of claim 1 wherein the monomer repeat units having pendent grafted polymer groups are isoprene monomer units.

7. The adhesive composition of claim 1 wherein the pendent grafted polymers are styrenic or (meth)acrylate grafted polymers.

8. The adhesive composition of claim 1 wherein the monomer units having pendent grafted polymer groups is of the formula:

$$-\!\!\left[\begin{array}{c}R^7\\|\\CH_2-C\\|\\R^2QZ\end{array}\right]\!\!-$$

wherein $R^2$ is a covalent bond or multivalent alkylene or arylene,
Q is —O—, —S—, —O—CO—, or —NR$^3$—, where $R^3$ is H or $C_1$-$C_4$ alkyl;
Z is grafted polymer group and $R^7$ is H or $CH_3$.

9. The adhesive composition of claim 1 wherein the copolymer is of the formula;

[copolymer structure with $CH_3$, $CH_2$, QZ, $R^2QZ$ groups and subscripts a, b, c]

wherein a is at least 20, and at least one of b and c are at least one,
$R^2$ is a covalent bond or multivalent alkylene or arylene,
Q is —O—, —S—, —O—CO—, or —NR$^3$—, where $R^3$ is H or $C_1$-$C_4$ alkyl;
Z is a grafted polymer group and $R^7$ is H or $CH_3$.

10. The adhesive composition of claim 1 wherein the isobutylene copolymer is of the formula;

[copolymer structure with $CH_3$, $R^7$, $R^2QZ$ groups and subscripts a, d]

wherein a is at least 20, d is at least one,
$R^2$ is a covalent bond or multivalent alkylene or arylene;
Q is —O—, —S—, —O—CO—, or —NR$^3$—, where $R^3$ is H or $C_1$-$C_4$ alkyl;
Z is grafted polymer group and $R^7$ is H or $CH_3$.

11. The adhesive composition of claim 1 wherein the isobutylene copolymer has a molecular weight ($M_w$) of 5,000 to 5,000,000.

12. The adhesive composition of claim 1, wherein said grafted polymer has 10 to 500 repeat units.

13. The adhesive composition of claim 1 comprising the grafted isobutylene polymer and 1 to 50 wt. % tackifier, relative to the total weight of the composition.

14. The adhesive composition of claim 1 comprising
a. greater than 30 wt. % isobutylene copolymer having pendent grafted polymer groups;
b. 1 to 50 wt. % of tackifier, and
c. 10 to 50 wt. % non-functional poly(isobutylene).

15. An adhesive article comprising a coating of the adhesive of claim 1 on a backing.

16. The adhesive composition of claim 1, wherein said isobutylene copolymer having pendent grafted polymer groups, is prepared by nucleophilic displacement of a halogenated isobutylene copolymer with a nucleophilic grafting polymer compound.

17. The adhesive composition of claim 16 wherein the nucleophilic grafting polymer compound is of the formula:

$$H—X^1—Z,$$

where
$X^1$ is —O—, —S—, —O—CO—, or —NR$^4$—, where $R^4$ is H or $C_1$-$C_4$ alkyl; and
Z is a (meth)acrylate or styrenic polymer.

18. The adhesive composition of claim 17 wherein Z is grafted polymer of the formula:

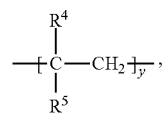

where $R^4$ is a hydrogen or a $C_1$-$C_4$ alkyl group, $R^5$ is a (hetero)aryl group, a cyclohexyl group or an ester group, and subscript y is 10 to 500.

* * * * *